United States Patent
Tanaka et al.

(10) Patent No.: US 7,177,101 B2
(45) Date of Patent: Feb. 13, 2007

(54) OPTICAL HEAD APPARATUS AND OPTICAL INFORMATION RECORDING AND REPRODUCTION APPARATUS

(75) Inventors: Yasuhiro Tanaka, Hyogo (JP); Tomohiko Sasano, Osaka (JP); Michihiro Yamagata, Osaka (JP); Daisuke Ogata, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 201 days.

(21) Appl. No.: 10/486,003

(22) PCT Filed: Aug. 7, 2002

(86) PCT No.: PCT/JP02/08051

§ 371 (c)(1), (2), (4) Date: Jan. 19, 2005

(87) PCT Pub. No.: WO03/017263

PCT Pub. Date: Feb. 27, 2003

(65) Prior Publication Data

US 2005/0122597 A1 Jun. 9, 2005

(30) Foreign Application Priority Data

Aug. 9, 2001 (JP) .............................. 2001-242866

(51) Int. Cl.
*G02B 9/04* (2006.01)
*G11B 7/00* (2006.01)

(52) U.S. Cl. .................... 359/793; 369/112.23

(58) Field of Classification Search .............. 359/784, 359/785, 793; 369/112.23
See application file for complete search history.

(56) References Cited

U.S. PATENT DOCUMENTS 5,157,555 A 10/1992 Reno (Continued)

FOREIGN PATENT DOCUMENTS

EP 1 043 615 10/2000

(Continued)

OTHER PUBLICATIONS

International Search Report corresponding to application No. PCT/JP02/08051 dated Oct. 8, 2002.

*Primary Examiner*—Scott J. Sugarman
(74) *Attorney, Agent, or Firm*—RatnerPrestia

(57) ABSTRACT

Disclosed is an optical head apparatus comprising: a light source; a collimating means of converting a beam of light emitted from the light source into a substantially parallel beam of light; a focusing means of focusing the light onto an information medium surface; a beam splitting means of splitting the beam of light modulated by the information medium; and a light receiving means of receiving the light modulated by the information medium, wherein a lens having a negative power and a lens having a positive power are arranged in this order as viewed from the collimating means side between the collimating means and the focusing means, and at least either one of the lenses is moved along an optical axis to correct spherical aberration occurring on the information medium surface, and wherein the distance from the lens having the positive power to the focusing means is set substantially equal to the focal length of the lens having the positive power.

7 Claims, 9 Drawing Sheets

U.S. PATENT DOCUMENTS

| | | |
|---|---|---|
| 5,818,643 A | 10/1998 | Fujioka |
| 5,995,292 A * | 11/1999 | McDonald .................. 359/637 |
| 6,721,259 B1 * | 4/2004 | Yamamoto et al. .... 369/112.26 |
| 6,937,544 B2 * | 8/2005 | Takehara et al. ......... 369/44.27 |
| 2002/0093744 A1 | 7/2002 | Yamamoto et al. |

FOREIGN PATENT DOCUMENTS

| | | |
|---|---|---|
| JP | 5-266511 | 10/1993 |
| JP | 9-197264 | 7/1997 |
| JP | 2000-131603 | 5/2000 |
| JP | 2002-150598 | 5/2002 |

* cited by examiner

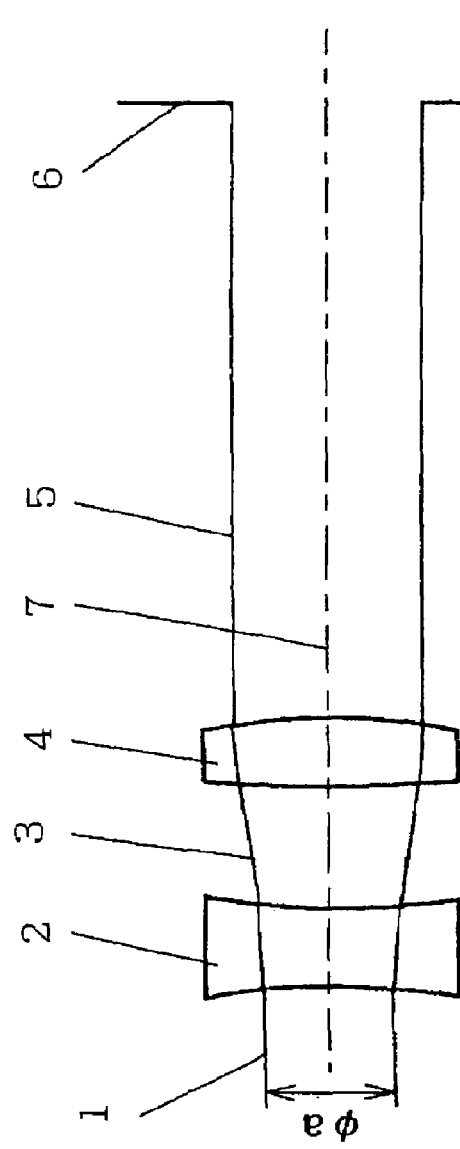
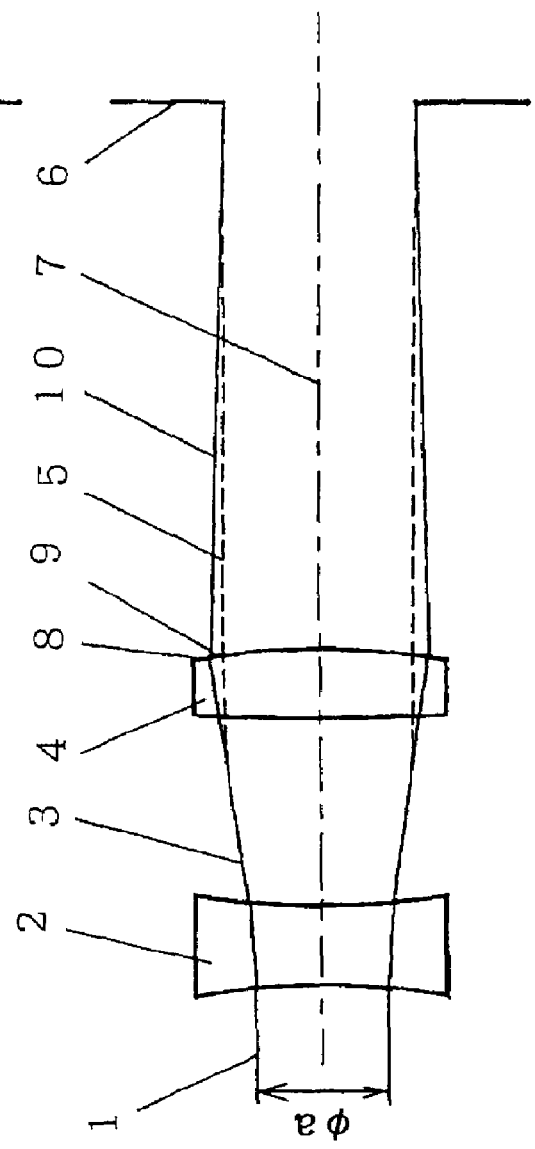
Fig. 1 (a)
Fig. 1 (b)

OPTICAL HEAD APPARATUS AND OPTICAL INFORMATION RECORDING AND REPRODUCTION APPARATUS

THIS APPLICATION IS A U.S. NATIONAL PHASE APPLICATION OF PCT INTERNATIONAL APPLICATION PCT/JP02/08051.

TECHNICAL FIELD

The present invention relates to an optical head apparatus for a digital video disk, a digital audio disk, an optical memory disk for a computer, and the like. The present invention relates more particularly to an optical head apparatus having the function of correcting the spherical aberration of an objective lens, and an optical information recording and reproduction apparatus.

BACKGROUND ART

To increase the recording density of optical disks, generally the light source wavelength has to be reduced or the NA of the objective lens has to be increased. For DVD optical disks, a wavelength of 650 nm and NA of 0.6 have been used, but it would be possible to increase the recording density by using a blue emitting light source with a wavelength of 400 nm and increasing the NA of the objective lens up to 0.85. With such an optical head, however, a slight error in optical disk substrate thickness would result in a large spherical aberration.

For example, in the case of the first-described DVD optical system, a substrate thickness error of 10 μm results in an RMS spherical aberration of about $0.01\lambda$, but with the latter optical system conditions, the same substrate thickness error of 10 μm would result in a spherical aberration of about $0.1\lambda$ which is 10 times larger.

Spherical aberration correcting optical systems have been proposed for correcting such spherical aberration. For example, Japanese Patent Application No. 2000-131603 proposes a method in which an afocal optical system is constructed using two lenses, a convex lens and a concave lens, and the spacing between the lenses is varied to correct spherical aberration.

In this optical system, however, if the convex lens or the concave lens is moved along the optical axis to correct spherical aberration, there arises a first problem, that is, the light utilization efficiency varies. This will be described in detail below.

A semiconductor laser or the like is used as the light source for an optical head. The far field intensity pattern of a semiconductor laser resembles a Gaussian distribution. That is, the intensity is the highest on the optical axis, and decreases with the distance from the optical axis. Generally, if it is attempted to increase the amount of light incident on an objective lens, the intensity of light at the periphery or rim intensity of the effective diameter of the object lens decreases. If the intensity of light at the periphery or rim intensity of the effective diameter decreases markedly, the diameter of the spot focused by the object lens increases. Conversely, if it is attempted to obtain a uniform intensity distribution within the effective diameter of the object lens, the efficiency of gathering light from the semiconductor laser drops. In this way, how much of the light emitted from the semiconductor laser is to be gathered into the objective lens is a crucial parameter that affects the performance of the optical head.

However, when one of the lenses in the afocal optical system is moved to correct spherical aberration, the angle of the light incident on the object lens changes when viewed from the semiconductor laser as the light source, and hence there has been the first problem in that the light gathering efficiency and the diameter of the spot focused by the object lens change.

Further, in the case of a disk comprising two layers of different thicknesses for increased storage capacity, the second layer is thicker than the first layer. Recording/reproduction on the second layer is performed using the light passed through the first layer. Recorded portions and non-recorded portions are unevenly distributed in the first layer, and this affects the recording/reproduction characteristics of the second layer. Hence, there arises a second problem, that is, it is desirable that the effective NA for the second layer be made larger.

In the case of a thick disk, coma aberration that occurs when the disk tilts increases. Further, the light absorption is larger than in the case of a thin disk, hence a third problem.

DISCLOSURE OF THE INVENTION

The present invention has been devised to solve the first problem of the prior art, and an object of the invention is to prevent the light gathering efficiency and the focused spot diameter from changing even when spherical aberration is corrected.

To achieve the above first object, the present invention is an optical head apparatus comprising: a light source; a collimating means of converting a beam of light emitted from the light source into a substantially parallel beam of light; a focusing means of focusing the light onto an information medium surface; a beam splitting means of splitting the beam of light modulated by the information medium; and a light receiving means of receiving the light modulated by the information medium, wherein a lens having a negative power and a lens having a positive power are arranged in this order as viewed from the collimating means side between the collimating means and the focusing means, and at least either one of the lenses is moved along an optical axis to correct spherical aberration occurring on the information medium surface, and wherein the distance from the lens having the positive power to the focusing means is set substantially equal to the focal length of the lens having the positive power.

In the present invention, when correcting the spherical aberration of an entire optical system by moving the lens in the light path along the direction of the optical axis and thereby varying the diverging angle of the beam incident on the objective lens. The height of the peripheral ray or marginal ray emitted from the spherical aberration correcting optical system decreases when the beam is more diverging from the neutral position, and increases when the beam is more converging, thereby ensuring that a uniform distribution of light intensity always enters the objective lens.

Further, the present invention is an optical information recording and reproduction apparatus which is equipped with any one of the above-described optical head apparatus, and which records information on or reproduces information from medium surface of an optical disk substrate by using the optical head apparatus.

BRIEF DESCRIPTION OF THE DRAWINGS

FIGS. 1(a)–1(b) are optical path diagrams showing one configuration example of an optical head apparatus according to the present invention.

DESCRIPTION OF REFERENCE NUMERALS

Figure 2:
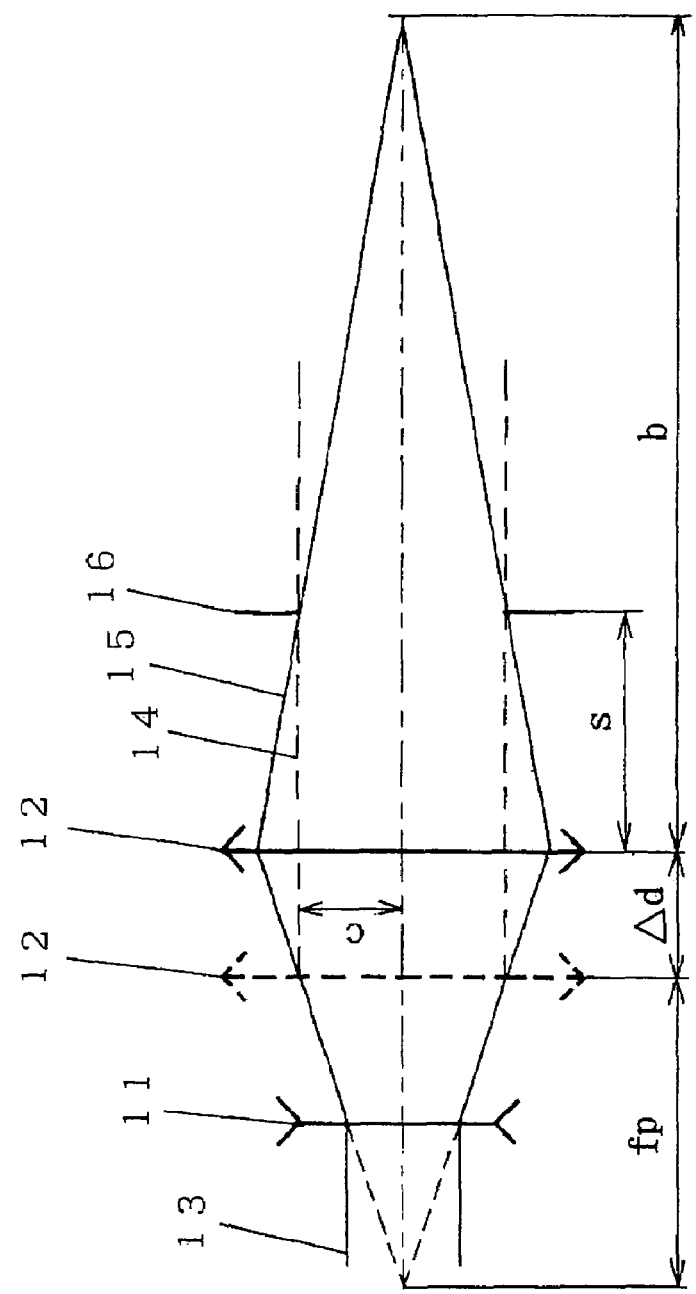
FIG. 2 is a schematic diagram illustrating the principle of the optical head apparatus according to the present invention.

1. PARALLEL LIGHT
2. CONCAVE LENS
3. DIVERGENT LIGHT
4. CONVEX LENS
5. PARALLEL LIGHT
6. APERTURE OF OBJECTIVE LENS
7. OPTICAL AXIS

BEST MODE FOR CARRYING OUT THE INVENTION (Embodiment 1)

An optical head apparatus according to the present invention will be described in detail below with reference to the drawings.

FIG. 1(a) is an optical path diagram showing the configuration of an optical head apparatus according to the present invention. Parallel light 1 with a beam diameter of φa enters a concave lens 2, and emerges as divergent light 3 which then enters a convex lens 4. The light entering the convex lens is converted back into parallel light 5 which reaches the aperture 6 of an objective lens. Here, when the convex lens 4 is moved along the optical axis 7 in the direction away from the concave lens 2 (FIG. 1(b)), since the light emerging from the concave lens 2 is divergent light, the height 8 of the ray emerging from the periphery of the convex lens 4 becomes higher than the corresponding height 9 of the parallel light. When the convex lens 4 is moved in the direction away from the concave lens 2, the light emerges as convergent light 10. Since the light whose height at the periphery is higher than in the case of the parallel light 5 emerges as the convergent light 10, the light reaches the aperture 6 of the objective lens just in the case of the parallel light, depending on the condition. That is, even when the convex lens 4 is moved to correct spherical aberration, the parallel light 1 with the beam diameter of φa enters the objective lens while maintaining its original intensity distribution.

Here, the condition that does not cause any change in the intensity distribution when the lens is moved to correct spherical aberration will be described in detail with reference to drawings. FIG. 2 is a schematic diagram illustrating the principle of the optical head apparatus according to the present invention. When the concave lens 11 and the convex lens 12 are placed in an afocal optical configuration, light 13 entering as parallel light emerges also as parallel light 14. The focal length of the convex lens 12 is denoted by fp. The peripheral ray or marginal ray height before the convex lens 12 is moved is denoted by c. When the convex lens 12 is moved along the optical axis by Δd in the direction away from the concave lens 11, the peripheral ray or marginal ray height increases by Δd·c/fp. The light emerges from the convex lens 12 as convergent light 15 which is brought to a focus at a distance of b from the convex lens. Paraxial imaging in this condition is given by the equation $$1/(fp+\Delta d)+1/b=1/fp$$

If the peripheral ray or marginal ray height at the aperture 16 of the objective lens located at a distance of s from the convex lens 12 is to be made the same as the height c of the parallel light, the following condition should be satisfied.

$$(c \cdot \Delta d / fp)/s = (c + c \cdot \Delta d / fp)/b$$

From the above equation, the relation $$s = fp$$

is obtained.

Therefore, it can be seen that, when the distance from the convex lens 12 to the aperture 16 of the objective lens is set equal to the focal length of the convex lens 12, the same intensity distribution and the same light utilization efficiency can be obtained at all times.

Here, since the convex lens 12 is moved along the optical axis, the distance from the convex lens to the aperture of the objective lens cannot be maintained at all times equal to the focal length of the convex lens.

However, the amount of movement, Δd, of the convex lens is sufficiently small compared with its focal length. Accordingly, the variation of the distance, s, from the convex lens to the aperture 16 of the objective lens with the movement of the convex lens can be regarded as being sufficiently small compared with the focal length of the convex lens.

Specific numerical examples according to a first embodiment of the present invention will be shown below. First, numerical examples for the objective lens used in common among the various numerical examples are shown. The objective lens comprises two elements in two groups, with the surface designated as the first surface, the second surface, the third surface, and the fourth surface as viewed from the spherical aberration correcting optical system. The optical disk comprises a plane parallel plate.

fb: Focal length of objective lens (mm)
Rb1: Radius of curvature of the first surface (mm)
Rb2: Radius of curvature of the second surface (mm)
Rb3: Radius of curvature of the third surface (mm)
Rb4: Radius of curvature of the fourth surface (mm)
Eb1: Spacing between the first lens and the second lens (mm)

db1: Thickness of the first lens (mm)
db2: Thickness of the second lens (mm)
nb1: Refractive index of the first lens for the operating wavelength
nb2: Refractive index of the second lens for the operating wavelength
ncd: Refractive index of the optical disk substrate for the operating wavelength
tc: Thickness of the optical disk transparent substrate on the information recording surface
W: Operating wavelength (nm)
fb=2.000
Rb1=1.900
Rb2=−7.800
Rb3=0.99466
Rb4: Plane
Eb1=1.150
db1=1.2
db2=1.0535
nb1=1.52331
nb2=1.52331
ncd=1.61736
tc=0.1
WD=0.30
W=405
Aspherical shape is given by the following equation (1)

$$X = \frac{Cjh^2}{1+\sqrt{1-(1+Kj)Cj^2h^2}} + \sum A_{j,n}h^n \quad \text{(Equation 1)}$$

The parameters in the above equation have the following meanings.
X: Distance from the tangential plane on the vertex of the aspherical surface to a point lying on the aspherical surface and having a height of h from the optical axis
h: Height from the optical axis
Cj: Curvature of the j-th surface at the vertex of the aspherical surface (Ci=1/Rj)
Kj: Conic constant of the j-th surface
Aj,n: n-th order aspherical coefficient of the j-th surface
Of the coefficients, only the aspherical coefficients of the objective lens are suffixed with "b".
kb1=−4.593396e−001
Ab1, 4=8.386037e−004
Ab1, 6=−2.243728e−004
Ab1, 8=−1.594195e−004
Ab1, 10=2.620701e−005
Ab1, 12=−2.738825e−005
kb2=1.272600e+001
Ab2, 4=−3.117861e−003
Ab2, 6=−1.073863e−003
Ab2, 8=1.258618e−004
Ab2, 10=−1.951853e−004
Ab2, 12=4.18124e−005
kb3=−6.080135e−001
Ab3, 4=3.894679e−002
Ab3, 6=1.463247e−002
Ab3, 8=1.262713e−002
Ab3, 10=−1.226316e−002
Ab3, 12=1.779569e−002

Next, numerical data are shown for the lenses constructed to correct the spherical aberration of the optical head optics. In the numerical examples given below, the lenses are designated as the first lens and the second lens as viewed from the light source side, and in each lens, the surface nearer to the light source is designated as the first surface, and the surface nearer to the objective lens as the second surface.

fp: Focal length of the convex lens (mm)
R11: Radius of curvature of the first surface of the first lens (mm)
R12: Radius of curvature of the second surface of the first lens (mm)
R21: Radius of curvature of the first surface of the second lens (mm)
R22: Radius of curvature of the second surface of the second lens (mm)
E1: Spacing between the first lens and the second lens (mm)
d1: Thickness of the first lens (mm)
d2: Thickness of the second lens (mm)
n1: Refractive index of the first lens for the operating wavelength
n2: Refractive index of the second lens for the operating wavelength
EFF: Diameter of the emergent beam on the objective lens side

EXAMPLE 1 fp=10.0
R11=−8.48
R12=14.3
R21=33.2
R22=−9.02
E1=2.0
d1=1.2
d2=1.2
n1=1.74188
n2=1.71791
EFF=3.0

Figure 3:
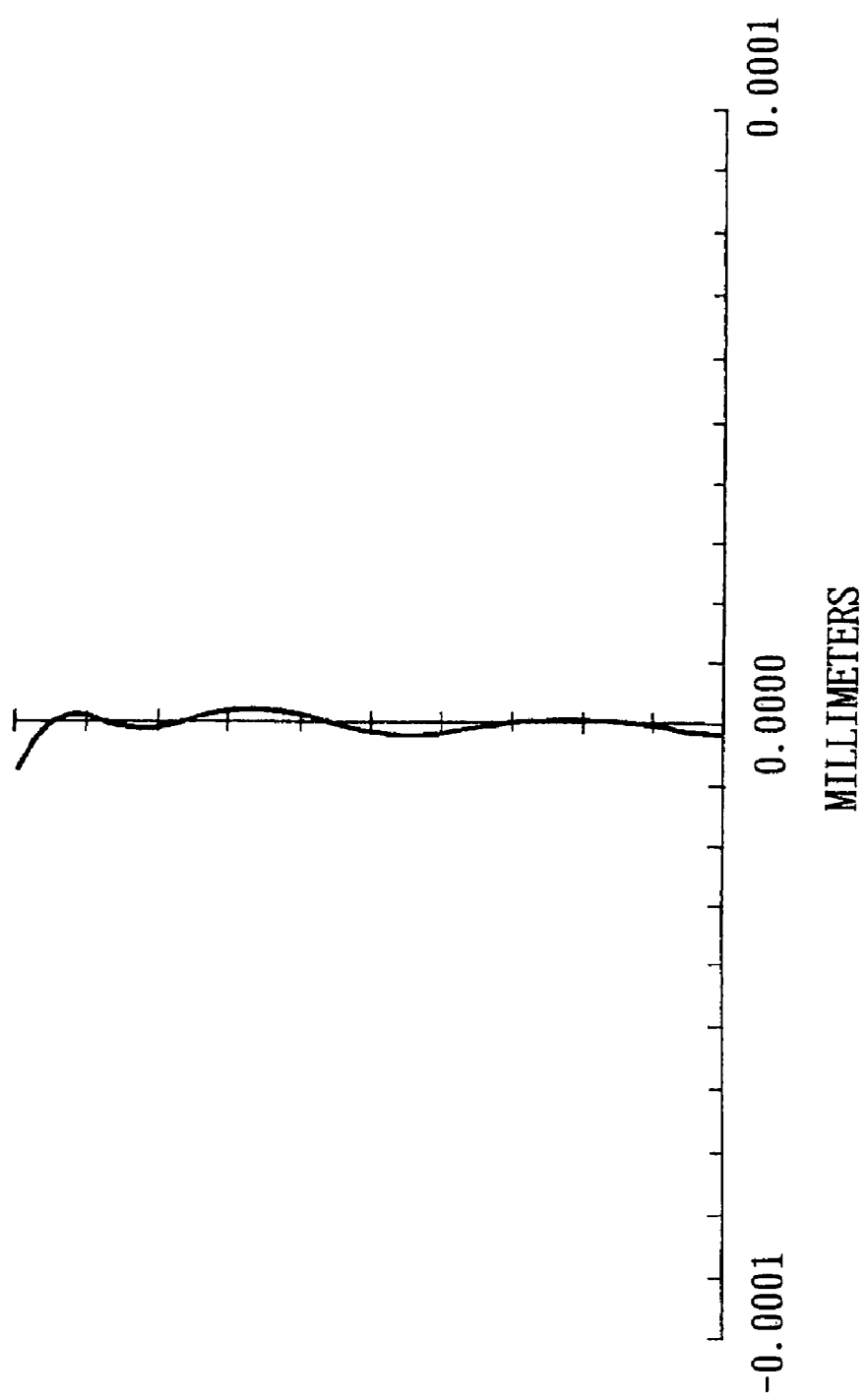
FIG. 3 is a diagram showing spherical aberration in a first example of the optical head apparatus according to the present invention.

Here, since the focal length of the convex lens is 10 mm, the distance from the convex lens to the first surface of the objective lens is also set to 10 mm, assuming that the aperture of the objective lens lies in the first surface of the objective lens. See FIG. 3.

The amount of third-order spherical aberration corrected when the convex lens is moved by ±0.5 mm is about 0.18λ: RMS. In the following description, when the convex lens is moved toward the light source, the amount of movement is designated as negative, and when the convex lens is moved toward the objective lens, the amount of movement is designated as positive.

The height of the light ray incident on the spherical aberration correcting optical system, which corresponds to the peripheral ray or marginal ray incident on the objective lens, is shown below along with the amount of movement of the convex lens when the distance from the convex lens to the objective lens is set to 10 mm.

Amount of Movement of Convex Lens Incident Ray Height

| | |
|---|---|
| −0.5 mm | 1.0426 mm |
| 0.0 mm | 1.0522 mm |
| +0.5 mm | 1.0568 mm |

Thus, it can be seen that when the distance from the convex lens to the objective lens is set substantially equal to the focal length of the convex lens, the variation of the incident ray height with the movement of the convex lens can be reduced to a very small value. The amount of variation of the incident ray height is less than 1%, which means that the incident ray height remains substantially unchanged; therefore, it can be said that substantially no change occurs in the light utilization efficiency as well as in the diameter of the spot focused by the objective lens.

EXAMPLE 2 fp=20.0
R11=−23.11
R12=24.93
R21=81.09
R22=−12.036
E1=2.5
d1=1.2
d2=2.0
n1=1.74188
n2=1.52801
EFF=3.0

Figure 4:
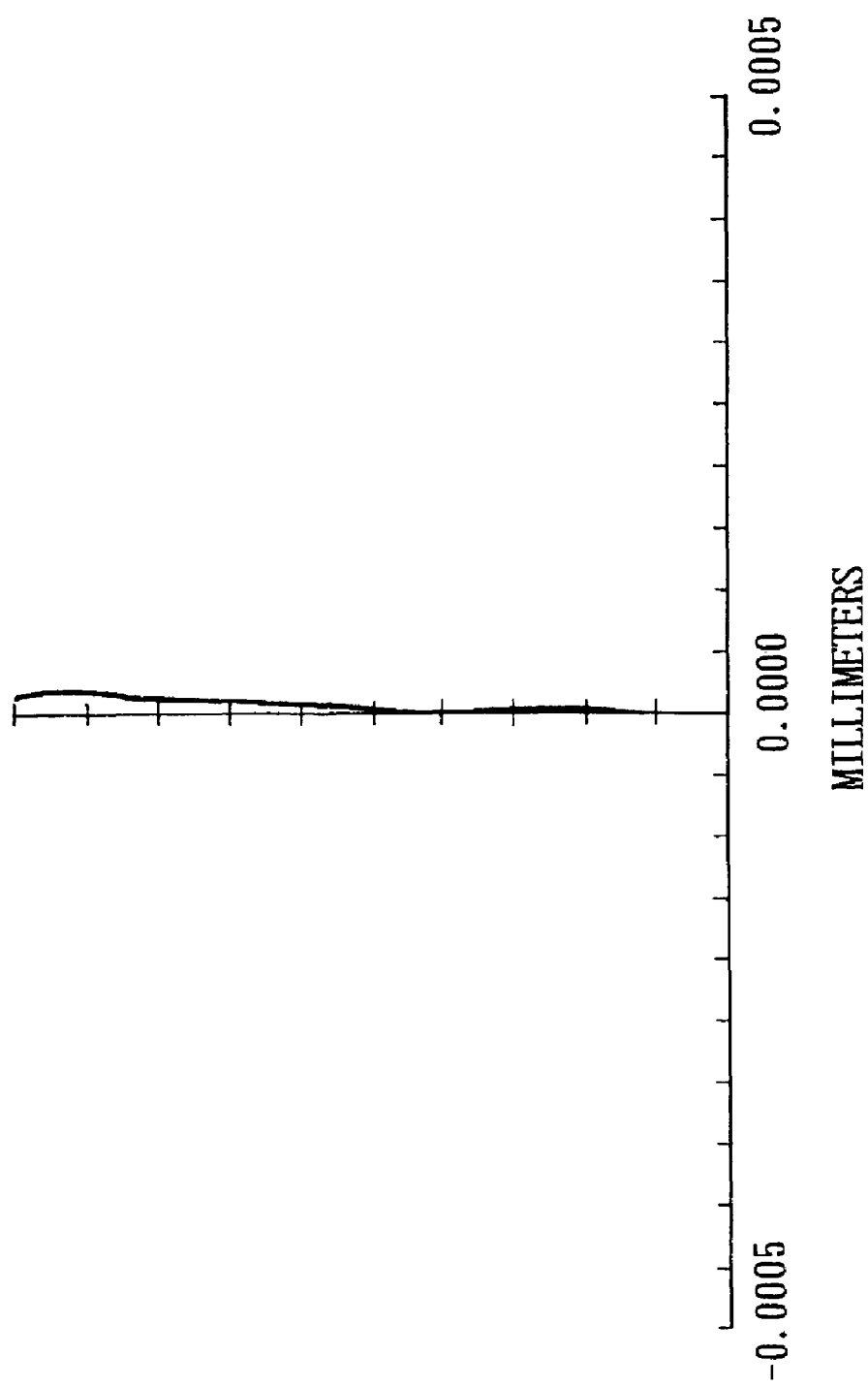
FIG. 4 is a diagram showing spherical aberration in a second example of the optical head apparatus according to the present invention.

Here, since the focal length of the convex lens is 20 mm, the distance from the convex lens to the first surface of the objective lens is also set to 20 mm, assuming that the aperture of the objective lens lies in the first surface of the objective lens. See FIG. 4.

The amount of third-order spherical aberration corrected when the convex lens is moved by ±1.5 mm is about 0.15λ: RMS. In the following description, when the convex lens is moved toward the light source, the amount of movement is designated as negative, and when the convex lens is moved toward the objective lens, the amount of movement is designated as positive.

The height of the light ray incident on the spherical aberration correcting optical system, which corresponds to the peripheral ray or marginal ray incident on the objective lens, is shown below along with the amount of movement of the convex lens when the distance from the convex lens to the objective lens is set to 20 mm.

Amount of Movement of Convex Lens Incident Ray Height

| −1.5 mm | 1.1897 mm |
| 0.0 mm | 1.1965 mm |
| +1.5 mm | 1.2016 mm |

Thus, it can be seen that when the distance from the convex lens to the objective lens is set substantially equal to the focal length of the convex lens, the variation of the incident ray height with the movement of the convex lens can be reduced to a very small value. The amount of variation of the incident ray height is less than 0.6%, which means that the incident ray height remains substantially unchanged; therefore, it can be said that substantially no change occurs in the light utilization efficiency as well as in the diameter of the spot focused by the objective lens.

EXAMPLE 3 fp=8.0
R11=−6.914
R12=5.35
R21=71.645
R22=−4.414
E1=3.0
d1=0.8
d2=1.5
n1=1.75747
n2=1.52331
EFF=3.7

Figure 5:
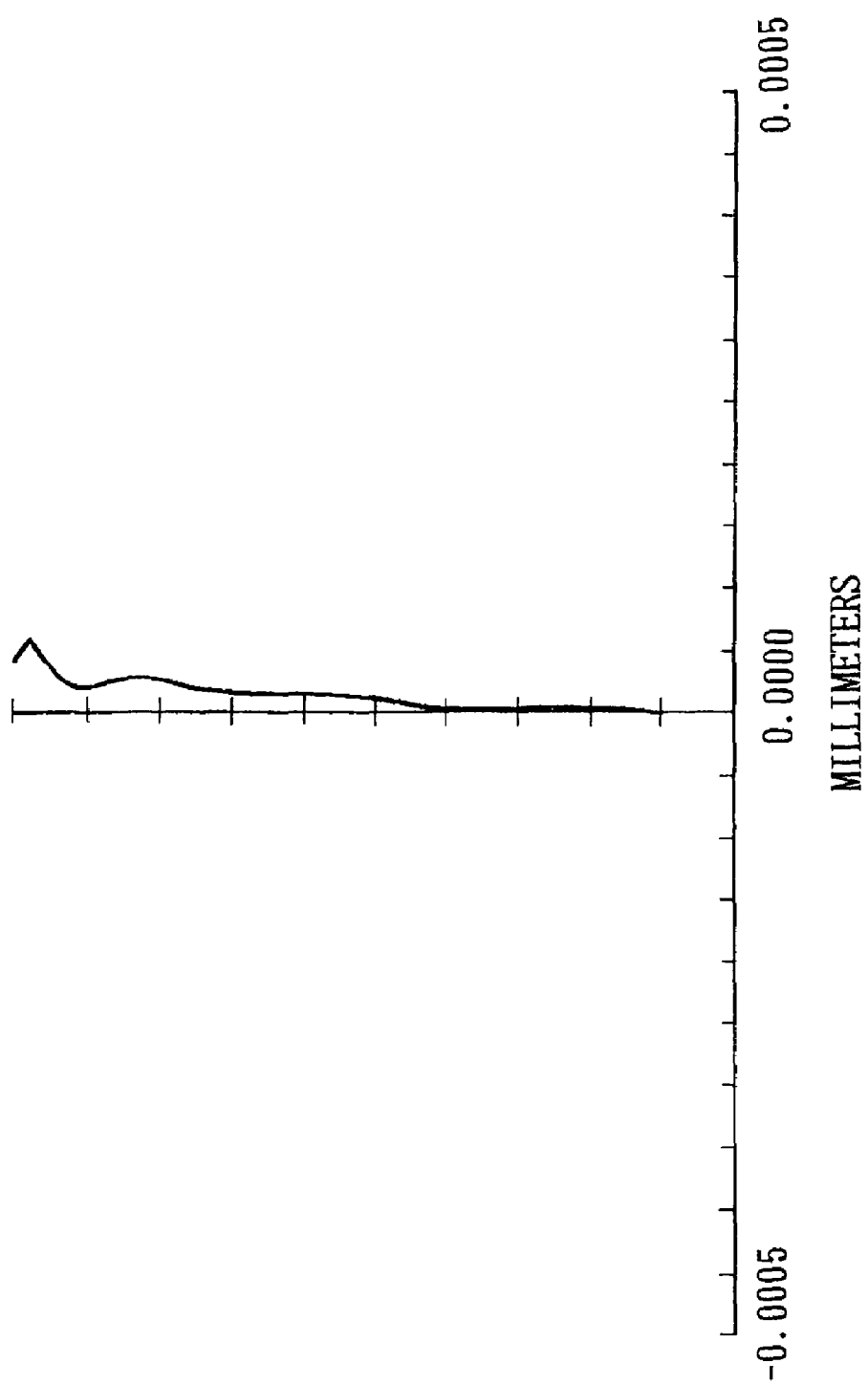
FIG. 5 is a diagram showing spherical aberration in a third example of the optical head apparatus according to the present invention.

The second surface of the second lens is aspherical, and its aspherical shape is also expressed by (equation 1). See FIG. 5.

k2=−0.1710231
A2, 4=2.839637×10$^{-5}$

Here, since the focal length of the convex lens is 8 mm, the distance from the convex lens to the first surface of the objective lens is also set to 8 mm, assuming that the aperture of the objective lens lies in the first surface of the objective lens.

The amount of third-order spherical aberration corrected when the convex lens is moved by ±0.25 mm is about 0.25λ: RMS. In the following description, when the convex lens is moved toward the light source, the amount of movement is designated as negative, and when the convex lens is moved toward the objective lens, the amount of movement is designated as positive.

The height of the light ray incident on the spherical aberration correcting optical system, which corresponds to the peripheral ray or marginal ray incident on the objective lens, is shown below along with the amount of movement of the convex lens when the distance from the Convex lens to the objective lens is set to 8 mm.

Amount of Movement of Convex Lens Incident Ray Height

| −0.25 mm | 0.8182 mm |
| 0.0 mm | 0.8208 mm |
| +0.25 mm | 0.8372 mm |

Thus, it can be seen that when the distance from the convex lens to the objective lens is set substantially equal to the focal length of the convex lens, the variation of the incident ray height with the movement of the convex lens can be reduced to a very small value. The amount of variation of the incident ray height is less than 0.3%, which means that the incident ray height remains substantially unchanged; therefore, it can be said that substantially no change occurs in the light utilization efficiency as well as in the diameter of the spot focused by the objective lens.

Next, one example of an optical head apparatus related to the present invention and invented by the present inventor will be described in detail with reference to drawing.

In the foregoing first embodiment, an afocal optical system comprising a concave lens and a convex lens has been used as the spherical aberration correcting optical system, but in the second embodiment described hereinafter, a single collimating lens which converts semiconductor laser light into parallel light is used as the spherical aberration correcting optical system.

Figure 6:
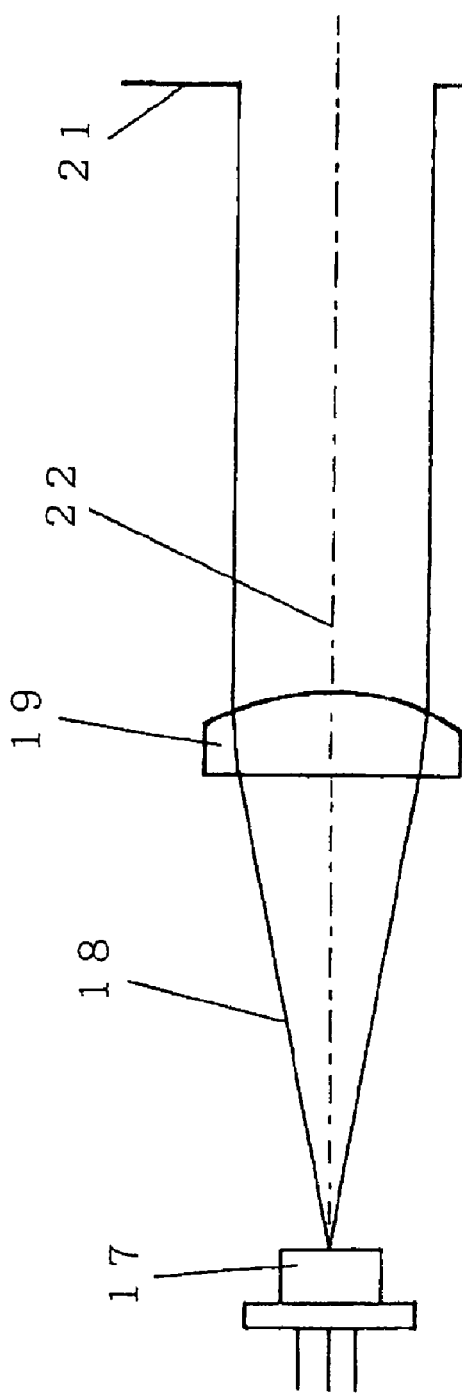
FIGS. 6(a)–6(b) are optical path diagrams showing one configuration example of an optical head apparatus according to the present invention.
Figure 6:
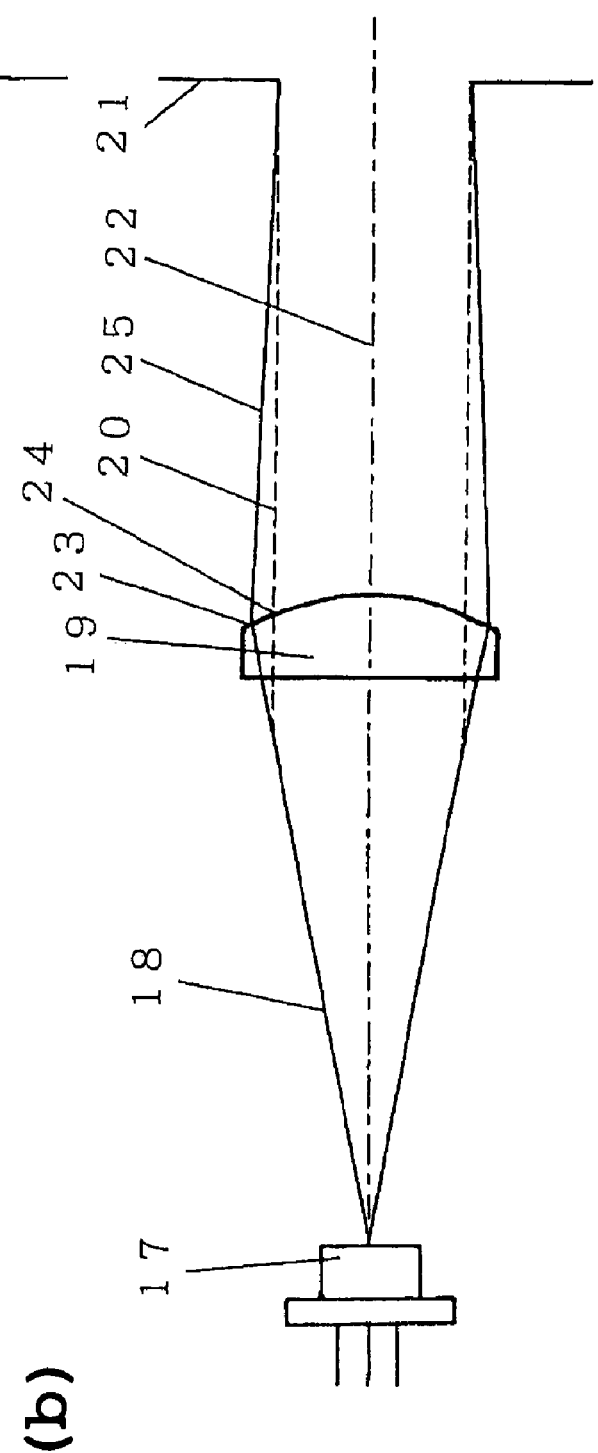

FIG. 6 is an optical path diagram illustrating the principle of the present embodiment. Light 18 emitted from a semiconductor laser 17 is converted by the collimating lens 19 into parallel light 20 which enters the aperture 21 of the objective lens. When the collimating lens 19 is moved along the optical axis 22 in the direction away from the semiconductor laser 17 (FIG. 6(*b*)), since the light emitted from the semiconductor laser 17 is divergent light, the height 23 of the ray emerging from the periphery of the collimating lens 19 becomes higher than the corresponding height 24 of the parallel light. When the collimating lens 19 is moved in the direction away from the semiconductor laser 17, the light emerges as convergent light 25.

Since the light whose height at the periphery is higher than in the case of the parallel light emerges as the convergent light 25, the light reaches the aperture 21 of the objective lens just as in the case of the parallel light, depending on the condition. That is, even when the collimating lens 19 is moved to correct spherical aberration, the light emitted from the semiconductor laser 17 enters the objective lens while maintaining its original intensity distribution.

If the convex lens shown in FIG. 2 is replaced by the collimating lens, the condition that no change is caused in the intensity distribution when the lens is moved to correct spherical aberration can be explained in exactly the same way. Therefore, it can be seen that, when the distance, s, from the collimating lens to the aperture of the objective lens is set equal to the focal length fc of the collimating lens, that is, $$s=fc$$

then the same intensity distribution and the same light utilization efficiency can be obtained at all times from the semiconductor laser.

Here, since the collimating lens is moved along the optical axis, the distance from the collimating lens to the aperture of the objective lens cannot be maintained at all times equal to the focal length of the collimating lens.

However, the amount of movement, Δd, of the collimating lens is sufficiently small compared with its focal length. Accordingly, the variation of the distance, s, from the collimating lens to the aperture of the objective lens with the movement of the collimating lens can be regarded as being sufficiently small compared with the focal length of the collimating lens.

Specific numerical examples according to the present embodiment will be described below. The parameters excluding those for the collimating lens, but including those for the objective lens, are the same as those in the first embodiment.

EXAMPLE 4

Specific numerical data in the fourth example are shown below. The surfaces of the collimating lens are designated as the first surface and the second surface as viewed from the light source side.

fc: Focal length of the collimating lens (mm)
R1: Radius of curvature of the first surface of the collimating lens (mm)
R2: Radius of curvature of the second surface of the collimating lens (mm)
d1: Thickness of the collimating lens (mm)
n1: Refractive index of the collimating lens for the operating wavelength
EFF: Diameter of the emergent beam on the objective lens side
fc=16.0
R1: Plane
R2=−10.72704
d1=2
n1=1.67044
EFF=3.4

Figure 7:
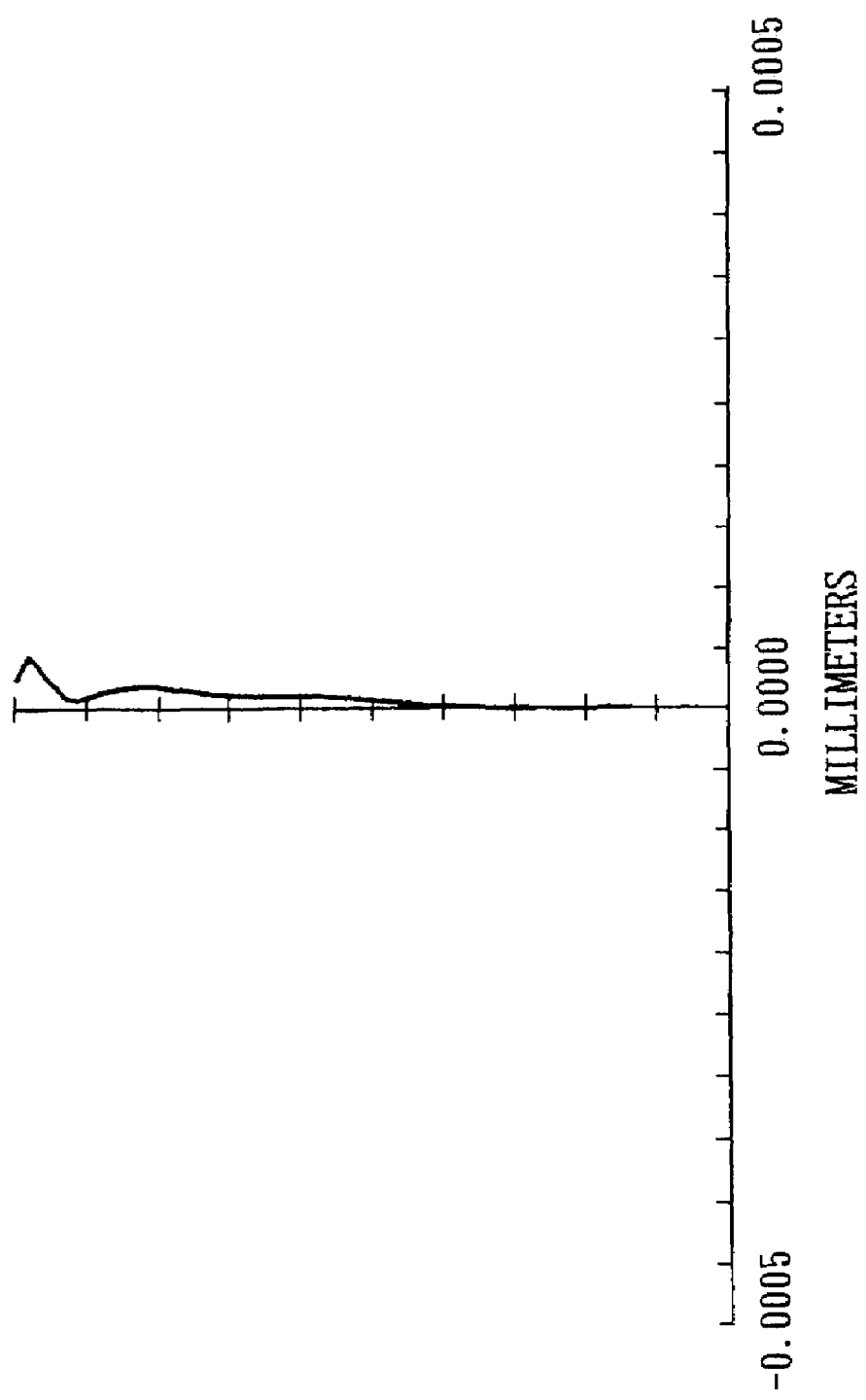
FIG. 7 is a diagram showing spherical aberration in the example of the optical head apparatus related to the present invention.

Here, since the focal length of the collimating lens is 16 mm, the distance from the collimating lens to the first surface of the objective lens is also set to 16 mm, assuming that the aperture of the objective lens lies in the first surface of the objective lens. See FIG. 7.

The amount of third-order spherical aberration corrected when the collimating lens is moved by ±0.8 mm is about 0.15λ: RMS. In the following description, when the collimating lens is moved toward the light source, the amount of movement is designated as negative, and when the collimating lens is moved toward the objective lens, the amount of movement is designated as positive.

The angle of the light ray incident on the collimating lens, which corresponds to the peripheral ray or marginal ray incident on the objective lens, is shown below along with the amount of movement of the collimating lens when the distance from the collimating lens to the objective lens is set to 16 mm.

Amount of Movement of Collimating Lens Incident Ray Angle

| | |
|---|---|
| −0.8 mm | 6.06097 degrees |
| 0.0 mm | 6.09702 degrees |
| +0.8 mm | 6.10389 degrees |

Thus, it can be seen that when the distance from the collimating lens to the objective lens is set substantially equal to the focal length of the collimating lens, the variation of the incident ray angle with the movement of the collimating lens can be reduced to a very small value. The amount of variation of the incident ray angle is less than 0.6%, which means that the incident ray angle remains substantially unchanged; therefore, it can be said that substantially no change occurs in the light utilization efficiency as well as in the diameter of the spot focused by the objective lens.

Figure 8:
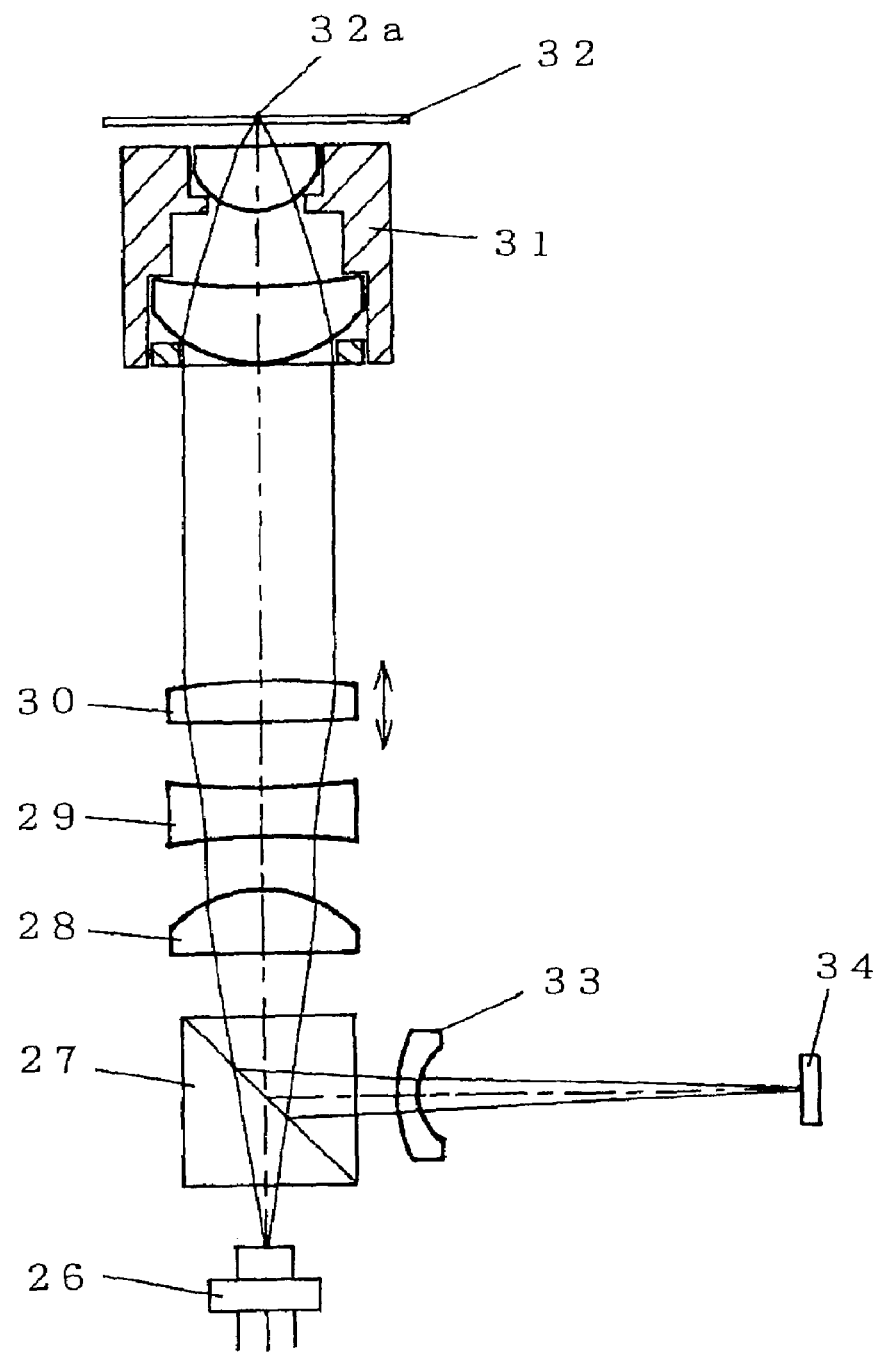
FIG. 8 is a diagram showing the configuration of an information recording and reproduction apparatus and the optical head apparatus shown in the embodiment of the present invention.

FIG. 8 is a diagram showing the configuration of an optical information recording and reproduction apparatus and an optical head apparatus according to the present invention that uses the optical system shown in the foregoing first embodiment. In FIG. 8, a beam of light emitted from a semiconductor laser 26, the light source, passes through a beam splitter 27 and is made substantially parallel by a collimating lens 28. The light further passes through a concave lens 29 and a convex lens 30, and emerges again as a substantially parallel beam of light which is then focused onto an information medium surface 32a of an optical disk 32 by the action of an objective lens 31 that comprises two elements in two groups as shown in the first to fourth examples. The focused spot is diffracted by pits and lands formed on the information medium surface 32a. The laser light diffracted and reflected by the information medium surface 32a passes through the objective lens 31, the convex lens 30, the concave lens 29, and the collimating lens 29, and is reflected by the beam splitter 27 into a detection lens 33 where the light is refracted and focused onto a photodetector 34. Based on an electrical signal output from the photodetector 34, a change in the intensity of light modulated by the information medium surface 32a is detected, thereby reading the data.

Here, the convex lens 30 is mounted in such a manner as to be movable along the optical axis and thereby correct the spherical aberration associated with the substrate thickness of the optical disk 32 and other optical head optics. When the distance from the convex lens to the objective lens 31 is set substantially equal to the focal length of the convex lens 30, the beam of light emitted from the semiconductor laser 26 enters the objective lens 31 while maintaining a constant beam size even if the convex lens 30 is moved along the optical axis.

In this way, not only the semiconductor laser light utilization in the objective lens but also the intensity of light incident on the periphery of the objective lens is maintained constant; as a result, the shape of the spot focused on the medium surface can also be maintained constant.

Figure 9:
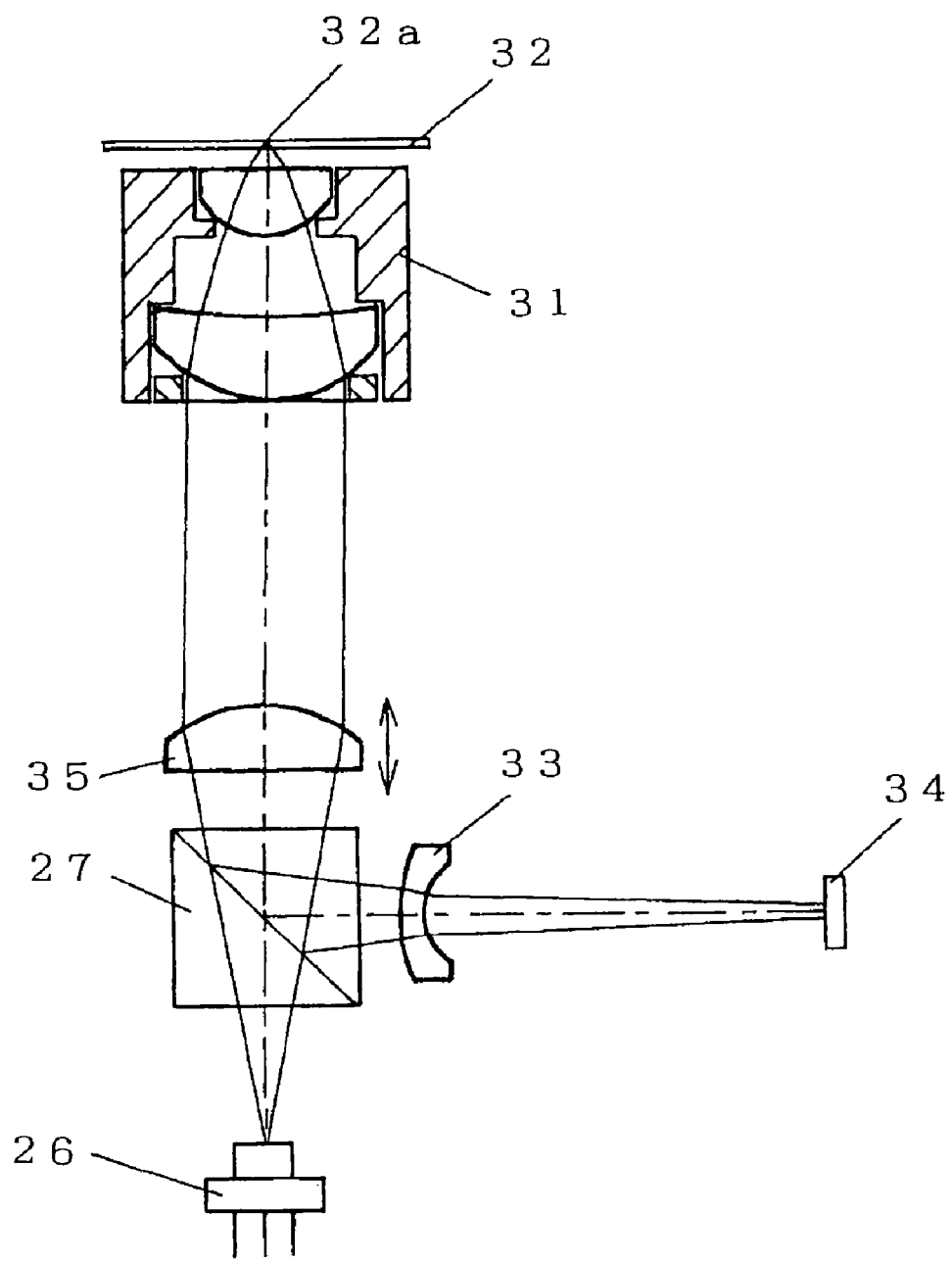
FIG. 9 is a diagram showing the configuration of an information recording and reproduction apparatus and the optical head apparatus related to the present invention.

FIG. 9 is a diagram showing the configuration of an optical information recording and reproduction apparatus and an optical head apparatus related to the present invention that uses the optical system shown in the one example described above. In FIG. 9, the beam of light emitted from the semiconductor laser light source 26, and passed through the beam splitter 27, is made substantially parallel by a collimating lens 35. Then, the light is focused onto the information medium surface 32a of the optical disk 32 by the action of the objective lens 31 that comprises two elements in two groups as shown in the first to fourth examples. The focused spot is diffracted by pits and lands formed on the information medium surface 32a. The laser light diffracted and reflected by the information medium surface 32a passes through the objective lens 31 and the collimating lens 35, and is reflected by the beam splitter 27 into the detection lens 33 where the light is refracted and focused onto the photodetector 34. Based on an electrical signal output from the photodetector 34, a change in the intensity of light modulated by the information medium surface 32a is detected thereby reading the data.

Here, the collimating lens 35 is mounted in such a manner as to be movable along the optical axis and thereby correct the spherical aberration associated with the substrate thickness of the optical disk 32 and other optical head optics. When the distance from the collimating lens to the objective lens 31 is set substantially equal to the focal length of the collimating lens 35, the beam of light emitted from the semiconductor laser 26 enters the objective lens 31 while maintaining a constant beam size even if the collimating lens 35 is moved along the optical axis. In this way, not only the semiconductor laser light utilization in the objective lens but also the intensity of light incident on the periphery of the objective lens is maintained constant; as a result, the shape of the spot focused on the medium surface can also be maintained constant.

In the above described embodiment, the convex lens is moved along the optical axis, but the same effect can be achieved if the concave lens is moved rather than the convex lens.

In each example, the convex lens and the concave lens have each been described as being constructed from a single lens, but alternatively, they may be constructed using lens groups of a plurality of lenses, one group having a positive power and the other having a negative power. Further, when constructing each lens group using a plurality of lenses, the lens group may be designed to exhibit an achromatic effect by combining convex and concave lenses having different dispersive powers, as is well known in the art. The achromatic effect can also be provided by integrating a diffractive element into each lens. Here, chromatic aberration can be corrected by the lens groups themselves, but alternatively, the spherical aberration correcting optical system may be designed to correct the chromatic aberration of the entire optical head system.

Further, in the above embodiment, since the convex lens and the concave lens are used in combination, if each lens is constructed from a single lens, the chromatic aberration correcting effect can be achieved by forming the convex lens from a material having small chromatic dispersion and the concave lens from a material having large chromatic dispersion.

In the above example, the collimating lens has been described as being constructed from a single aspherical lens, but the collimator may be constructed from a combination of a plurality of lens elements. The collimating lens may be constructed from a plurality of lens elements to provide an achromatic effect in the same manner as described above, or the lens may be combined with a diffractive element so as to correct chromatic aberration. In that case, the chromatic aberration of the collimating lens itself may be corrected, or alternatively, the collimating lens may be designed to correct the chromatic aberration of the entire optical head system.

In the above embodiment, the optical system has been described as being constructed as an afocal optical system in which parallel incident light emerges as parallel light, but the optical system may be constructed as an optical system in which either the incident light or the emergent light or both of them are non-parallel light. For example, when the emergent light is divergent light, the objective lens should be constructed to correct aberration for the divergent light; the same also applies to the case of convergent light.

Further, in the above example, the collimating lens is designed to make the light substantially parallel, but it may be designed so that the light emerges from it as divergent light or convergent light. Likewise, the objective lens may be constructed from a lens aberration-corrected for the divergent light or the convergent light.

Next, another example related to the present invention and invented by the present inventor will be described. This example provides an optical head apparatus comprising: a light source; a collimating means of converting a beam of light emitted from the light source into a substantially parallel beam of light; a focusing means of focusing the light onto an information medium surface; a beam splitting means of splitting the beam of light modulated by the information medium; and a light receiving means of receiving the light modulated by the information medium, wherein a lens having a negative power and a lens having a positive power are arranged in this order as viewed from the collimating means side between the collimating means and the focusing means, and at least either one of the lenses is moved along an optical axis to correct spherical aberration occurring on the information medium surface, and wherein the apparatus satisfies the condition $$f<d<1.25f$$

where f is the focal length of the lens having the positive power, and d is the distance from the lens having the positive power to the focusing means.

That is, when the distance from the lens having the positive power to the focusing means is larger than the focal length of the lens, the following merit is obtained. In the case of a disk comprising two layers of different thicknesses for increased storage capacity, the second layer is thicker than the first layer. Recording/reproduction on the second layer is performed using the light passed through the first layer. Recorded portions and non-recorded portions are unevenly distributed in the first layer, and this affects the recording/reproduction characteristics of the second layer. It is therefore desirable that the effective NA for the second layer be made larger. Here, when the distance from the lens having the positive power to the focusing means is larger than the focal length of the lens as described above, the effective NA for the second layer is larger, so that the beam can be focused into a smaller spot, and the resistance to noise thus increases.

More specifically, when using the convex lens shown in the first example, the distance from the convex lens to the objective lens is set in the range of about 10 mm to 12.5 mm.

The height of the light ray incident on the spherical aberration correcting optical system, which corresponds to the peripheral ray or marginal ray incident on the objective lens, is shown below along with the amount of movement of the convex lens when the distance from the convex lens to the objective lens is set to 12.5 mm.

Amount of Movement of Convex Lens Incident Ray Height

| | |
|---|---|
| −0.5 mm | 1.0293 mm |
| 0.0 mm | 1.0522 mm |
| +0.5 mm | 1.0710 mm |

On the other hand, when using the convex lens shown in the second example, the distance from the convex lens to the objective lens is set in the range of 20 mm to 25 mm.

The height of the light ray incident on the spherical aberration correcting optical system, which corresponds to the peripheral ray or marginal ray incident on the objective lens, is shown below along with the amount of movement of the convex lens when the distance from the convex lens to the objective lens is set to 25 mm.

Amount of Movement of Convex Lens Incident Ray Height

| | |
|---|---|
| −1.5 mm | 1.1676 mm |
| 0.0 mm | 1.1965 mm |
| +1.5 mm | 1.2254 mm |

Further, when using the convex lens shown in the third example, the distance from the convex lens to the objective lens is set in the range of about 8 mm to 10 mm.

The height of the light ray incident on the spherical aberration correcting optical system, which corresponds to the peripheral ray or marginal ray incident on the objective lens, is shown below along with the amount of movement of the convex lens when the distance from the convex lens to the objective lens is set to 10 mm.

Amount of Movement of Convex Lens Incident Ray Height

| | |
|---|---|
| −0.25 mm | 0.8109 mm |
| 0.0 mm | 0.8208 mm |
| +0.25 mm | 0.8456 mm |

As shown above, when the convex lens is moved in the negative direction, that is, in the direction opposite to the objective lens, the incident ray height decreases. That the incident ray height decreases means that, of the light rays emitted from the semiconductor laser, only the rays nearer to the center are used, and therefore that the light intensity distribution becomes more uniform. As a result, the effective NA increases, and the beam can be focused into a smaller spot. On the other hand, moving the convex lens in the negative direction means correcting aberration for a thicker disk. Accordingly, when performing recording/reproduction on the second layer of the two-layer disk, since the beam is focused into a smaller spot, the resistance to noise can be increased.

In still another example related to the present invention and invented by the present inventor, there is provided an optical head apparatus comprising: a light source; a collimating lens which converts a beam of light emitted from the light source into a substantially parallel beam of light; a focusing means of focusing the light onto an information medium surface; a beam splitting means of splitting the beam of light modulated by the information medium; and a light receiving means of receiving the light modulated by the information medium, wherein the collimating lens is moved along an optical axis to correct spherical aberration occurring on the information medium surface, and wherein the apparatus satisfies the condition fc<dc<1.25fc where fc is the focal length of the collimating lens, and dc is the distance from the collimating lens to the focusing means.

That is, as in the foregoing example, when the distance from the collimating lens to the focusing means is larger than the focal length of the collimating lens, the effective NA for the second layer of the two-layer disk is larger, so that the beam can be focused into a smaller spot, and the resistance to noise thus increases.

More specifically, when using the collimating lens shown in the fourth example, the distance from the collimating lens to the objective lens is set in the range of about 16 mm to 20 mm.

The angle of the light ray incident on the collimating lens, which corresponds to the peripheral ray or marginal ray incident on the objective lens, is shown below along with the amount of movement of the collimating lens when the distance from the collimating lens to the objective lens is set to 20 mm.

Amount of Movement of Collimating Lens Incident Ray Angle

| | |
|---|---|
| −0.8 mm | 5.98621 degrees |
| 0.0 mm | 6.09702 degrees |
| +0.8 mm | 6.18210 degrees |

As shown above, when the collimating lens is moved in the negative direction, that is, in the direction opposite to the objective lens, the incident ray angle decreases. That the incident ray angle decreases means that, of the light rays emitted from the semiconductor laser, only the rays nearer to the center are used, and therefore that the light intensity distribution becomes more uniform. As a result, the effective NA increases, and the beam can be focused into a smaller spot. On the other hand, moving the collimating lens in the negative direction means correcting aberration for a thicker disk. Accordingly, when performing recording/reproduction on the second layer of the two-layer disk, since the beam is focused into a smaller spot, the resistance to noise can be increased.

Next, a further example related to the present invention and invented by the present inventor will be described. This example provides an optical head apparatus comprising: a light source; a collimating means of converting a beam of light emitted from the light source into a substantially parallel beam of light; a focusing means of focusing the light onto an information medium surface; a beam splitting means of splitting the beam of light modulated by the information medium; and a light receiving means of receiving the light modulated by the information medium, wherein a lens having a negative power and a lens having a positive power are arranged in this order as viewed from the collimating means side between the collimating means and the focusing means, and at least either one of the lenses is moved along an optical axis to correct spherical aberration occurring on the information medium surface, and wherein the apparatus satisfies the condition $$0.5f<d<f$$

where f is the focal length of the lens having the positive power, and d is the distance from the lens having the positive power to the focusing means.

That is, when the distance from the lens having the positive power to the focusing means is smaller than the focal length of the lens, the following merit is obtained.

When the distance from the lens to the focusing means is set smaller than the focal length of the lens, the amount of light increases in the case of a thick disk. On the other hand, the semiconductor laser light source has a light intensity distribution such that the intensity is the highest in the center and decreases toward the periphery. That is, increasing the amount of light means that the light at the periphery of the semiconductor laser is also gathered; as a result, the intensity of the peripheral ray or marginal ray incident on the objective lens decreases. This in effect means that the NA decreases. Since coma aberration that occurs when the disk tilts increases in the case of a thick disk, the NA thus decreased offers the effect of reducing the amount of coma aberration.

Further, in the case of a thick disk, light absorption is larger than in the case of a thin disk; accordingly, when the distance from the lens to the focusing means is set smaller than the focal length of the lens, a desirable result is obtained because the amount of light increases in the case of a thick disk.

More specifically, when using the convex lens shown in the first example, the distance from the convex lens to the objective lens is set in the range of 5 mm to 10 mm.

The height of the light ray incident on the spherical aberration correcting optical system, which corresponds to the peripheral ray or marginal ray incident on the objective lens, is shown below along with the amount of movement of the convex lens when the distance from the convex lens to the objective lens is set to 5 mm.

Amount of Movement of Convex Lens Incident Ray Height

| −0.5 mm | 1.0705 mm |
| 0.0 mm | 1.0522 mm |
| +0.5 mm | 1.0295 mm |

On the other hand, when using the convex lens shown in the second example, the distance from the convex lens to the objective lens is set in the range of about 10 mm to 20 mm.

The height of the light ray incident on the spherical aberration correcting optical system, which corresponds to the peripheral ray or marginal ray incident on the objective lens, is shown below along with the amount of movement of the convex lens when the distance from the convex lens to the objective lens is set to 10 mm.

Amount of Movement of Convex Lens Incident Ray Height

| −1.5 mm | 1.2367 mm |
| 0.0 mm | 1.1965 mm |
| +1.5 mm | 1.1569 mm |

Further, when using the convex lens shown in the third example, the distance from the convex lens to the objective lens is set in the range of about 4 mm to 8 mm.

The height of the light ray incident on the spherical aberration correcting optical system, which corresponds to the peripheral ray or marginal ray incident on the objective lens, is shown below along with the amount of movement of the convex lens when the distance from the convex lens to the objective lens is set to 4 mm.

Amount of Movement of Convex Lens Incident Ray Height

| −0.25 mm | 0.8333 mm |
| 0.0 mm | 0.8208 mm |
| +0.25 mm | 0.8212 mm |

As shown above, when the convex lens is moved in the negative direction, that is, in the direction opposite to the objective lens, the incident ray height increases. That the incident ray height increases means that the light emitted from the semiconductor laser is used in a wider range, and therefore that the intensity of light at the periphery drops. Accordingly, the effective NA decreases. On the other hand, moving the convex lens in the negative direction means correcting aberration for a thicker disk. As the disk thickness increases, the coma aberration that occurs when the disk tilts increases, affecting the recording/reproduction characteristics. At this time, since the effective NA decreases, the coma aberration caused by disk tilt can be reduced.

In a still further example related to the present invention and invented by the present inventor, there is provided an optical head apparatus comprising: a light source; a collimating lens which converts a beam of light emitted from the light source into a substantially parallel beam of light; a focusing means of focusing the light onto an information medium surface; a beam splitting means of splitting the beam of light modulated by the information medium; and a light receiving means of receiving the light modulated by the information medium, wherein the collimating lens is moved along an optical axis to correct spherical aberration occurring on the information medium surface, and wherein the apparatus satisfies the condition $$0.5fc<dc<fc$$

where fc is the focal length of the collimating lens, and dc is the distance from the collimating lens to the focusing means.

That is, when the distance from the collimating lens to the focusing means is smaller than the focal length of the lens, a similar merit to that described above is obtained. That is, a desirable effect can be obtained in relation to light absorption.

More specifically, when using the collimating lens shown in the fourth example, the distance from the collimating lens to the objective lens is set in the range of about 8 mm to 16 mm.

The angle of the light ray incident on the collimating lens, which corresponds to the peripheral ray or marginal ray incident on the objective lens, is shown below along with the amount of movement of the collimating lens when the distance from the collimating lens to the objective lens is set to 8 mm.

Amount of Movement of Collimating Lens Incident Ray Angle

| | |
|---|---|
| −0.8 mm | 6.21621 degrees |
| 0.0 mm | 6.09702 degrees |
| +0.8 mm | 5.95344 degrees |

As shown above, when the collimating lens is moved in the negative direction, that is, in the direction opposite to the objective lens, the incident ray angle increases. That the incident ray angle increases means that the light emitted from the semiconductor laser is used in a wider range, and therefore that the intensity of light at the periphery drops. Accordingly, the effective NA decreases. On the other hand, moving the convex lens in the negative direction means correcting aberration for a thicker disk. As the disk thickness increases, the coma aberration that occurs when the disk tilts increases, affecting the recording/reproduction characteristics. At this time, since the effective NA decreases, the coma aberration caused by disk tilt can be reduced.

Essential patentable portions of the above described examples related to the present invention and invented by the present inventor will be disclosed below.

The first aspect of the invention provides an optical head apparatus comprising: a light source; a collimating lens which converts a beam of light emitted from the light source into a substantially parallel beam of light; a focusing means of focusing the light onto an information medium surface; a beam splitting means of splitting the beam of light modulated by the information medium; and a light receiving means of receiving the light modulated by the information medium, wherein the collimating lens is moved along an optical axis to correct spherical aberration occurring on the information medium surface, and wherein the distance from the collimating lens to the focusing means is set substantially equal to the focal length of the collimating lens.

In this way, in the first aspect of the invention, when correcting the spherical aberration of the entire optical system by moving the lens in the light path along the direction of the optical axis and thereby varying the diverging angle of the beam incident on the objective lens, the height of the peripheral ray or marginal ray emitted from the spherical aberration correcting optical system decreases when the beam is more diverging from the neutral position, and increases when the beam is more converging, thereby ensuring that a uniform distribution of light intensity always enters the objective lens.

The second aspect of the invention provides an optical head apparatus comprising: a light source; a collimating means of converting a beam of light emitted from the light source into a substantially parallel beam of light; a focusing means of focusing the light onto an information medium surface; a beam splitting means of splitting the beam of light modulated by the information medium; and a light receiving means of receiving the light modulated by the information medium, wherein a lens having a negative power and a lens having a positive power are arranged in this order as viewed from the collimating means side between the collimating means and the focusing means, and at least either one of the lenses is moved along an optical axis to correct spherical aberration occurring on the information medium surface, and wherein the apparatus satisfies the condition $$f<d<1.25f$$

where f is the focal length of the lens having the positive power, and d is the distance from the lens having the positive power to the focusing means.

The second aspect of the invention has been devised to solve the second problem of the prior art, and can overcome any possible adverse effects that may be caused to the recording and reproduction characteristics of the second layer. Furthermore, with the above numerical range, the effect that a uniform distribution of light intensity always enters the objective lens can be achieved, if not fully, but to the extent that no problems is caused in practice.

The third aspect of the invention provides an optical head apparatus comprising: a light source; a collimating lens which converts a beam of light emitted from the light source into a substantially parallel beam of light; a focusing means of focusing the light onto an information medium surface; a beam splitting means of splitting the beam of light modulated by the information medium; and a light receiving means of receiving the light modulated by the information medium, wherein the collimating lens is moved along an optical axis to correct spherical aberration occurring on the information medium surface, and wherein the apparatus satisfies the condition $$fc<dc<1.25fc$$

where fc is the focal length of the collimating lens, and dc is the distance from the collimating lens to the focusing means.

The third aspect of the invention has been devised to solve the second problem of the prior art, and can overcome any possible adverse effects that may be caused to the recording and reproduction characteristics of the second layer. Furthermore, with the above numerical range, the effect that a uniform distribution of light intensity always enters the objective lens can be achieved, if not fully, but to the extent no problem is caused in practice.

The fourth aspect of the invention provides an optical head apparatus comprising: a light source; a collimating means of converting a beam of light emitted from the light source into a substantially parallel beam of light; a focusing means of focusing the light onto an information medium surface; a beam splitting means of splitting the beam of light modulated by the information medium; and a light receiving means of receiving the light modulated by the information medium, wherein a lens having a negative power and a lens having a positive power are arranged in this order as viewed from the collimating means side between the collimating means and the focusing means, and at least either one of the lenses is moved along an optical axis to correct spherical aberration occurring on the information medium surface, and wherein the apparatus satisfies the condition $$0.5f<d<f$$

where f is the focal length of the lens having the positive power, and d is the distance from the lens having the positive power to the focusing means.

The fourth aspect of the invention has been devised to solve the third problem of the prior art, and can alleviate the adverse effects associated with the coma aberration and light absorption; furthermore, with the above numerical range, the effect that a uniform distribution of light intensity always enters the objective lens can be achieved, if not fully, but to the extent that no problem is caused in practice.

The fifth aspect of the invention provides an optical head apparatus comprising: a light source; a collimating lens which converts a beam of light emitted from the light source into a substantially parallel beam of light; a focusing means of focusing the light onto an information medium surface; a beam splitting means of splitting the beam of light modulated by the information medium; and a light receiving means of receiving the light modulated by the information medium, wherein the collimating lens is moved along an optical axis to correct spherical aberration occurring on the information medium surface, and wherein the apparatus satisfies the condition $$0.5fc<dc<fc$$

where fc is the focal length of the collimating lens, and dc is the distance from the collimating lens to the focusing means.

The fifth aspect of the invention has been devised to solve the third problem of the prior art, and can alleviate the adverse effects associated with the coma aberration and light absorption; furthermore, with the above numerical range, the effect that a uniform distribution of light intensity always enters the objective lens can be achieved, if not fully, but to the extent that no problem is caused in practice.

As described above, according to the present invention, the light gathering efficiency and the focused spot diameter can be prevented from changing even when spherical aberration is corrected.

The invention can also provide an optical information recording and reproduction apparatus having an effect equivalent to the above.

What is claimed is:

1. An optical head apparatus comprising: a light source; a collimating means of converting a beam of light emitted from the light source into a substantially parallel beam of light; a focusing means of focusing the light onto an information medium surface; a beam splitting means of splitting the beam of light modulated by the information medium; and a light receiving means of receiving the light modulated by the information medium, wherein
  a lens having a negative power and a lens having a positive power are arranged in this order as viewed from the collimating means side between the collimating means and the focusing means, and
  at least either one of the lenses is moved along an optical axis to correct spherical aberration occurring on the information medium surface, and wherein
  the distance from the lens having the positive power to the focusing means is set substantially equal to the focal length of the lens having the positive power.

2. An optical information recording and reproduction apparatus which is equipped with the optical head apparatus of claim 1, and which records information on or reproduces information from medium surface of an optical disk substrate by using the optical head apparatus.

3. An optical head apparatus, comprising:
  a light source;
  a collimating lens which converts a beam of light emitted from the light source into a substantially parallel beam of light;
  a focusing means of focusing the light onto an information medium surface;
  a beam splitting means of splitting the beam of light modulated by the information medium; and
  a light receiving means of receiving the light modulated by the information medium,
  wherein the collimating lens is moved along an optical axis to correct spherical aberration occuring on the information medium surface, and
  wherein the distance from the collimating lens to the focusing means is set substantially equal to the focal length of the collimating lens.

4. An optical head apparatus, comprising:
  a light source;
  a collimating means of converting a beam of light emitted from the light source into a substantially parallel beam of light;
  a focusing means of focusing the light onto an information medium surface;
  a beam splitting means of splitting the beam of light modulated by the information medium; and a light receiving means of receiving the light modulated by the information medium,
  wherein a lens having a negative power and a lens having a positive power are arranged in this order as viewed from the collimating means side between the collimating means and the focusing means, and at least either one of the lenses is moved along an optical axis to correct spherical aberration occuring on the information medium surface, and
  wherein the apparatus satisfies the condition $$f<d<1.25f$$

where f is the focal length of the lens having the positive power, and d is the distance from the lens having the positive power to the focusing means.

5. An optical head apparatus, comprising:
  a light source;
  a collimating lens which converts a beam of light emitted from the light source into a substantially parallel beam of light;
  a focusing means of focusing the light onto an information medium surface;
  a beam splitting means of splitting the beam of light modulated by the information medium; and a light receiving means of receiving the light modulated by the information medium,
  wherein the collimating lens is moved along an optical axis to correct spherical aberration occurring on the information medium surface, and
  wherein the apparatus satisfies the condition $$fc<dc<1.25fc$$

where fc is the focal length of the collimating lens, and dc is the distance from the collimating lens to the focusing means.

6. An optical head apparatus, comprising:
  a light source;
  a collimating means of converting a beam of light emitted from the light source into a substantially parallel beam of light;
  a focusing means of focusing the light onto an information medium surface;
  a beam splitting means of splitting the beam of light modulated by the information medium; and
  a light receiving means of receiving the light modulated by the information medium,
  wherein a lens having a negative power and a lens having a positive power are arranged in this order as viewed from the collimating means side between the collimating means and the focusing means, and at least either one of the lenses is moved along an optical axis to correct spherical aberration occurring on the information medium surface, and wherein the apparatus satisfies the condition $$0.5f < d < f$$

where f is the focal length of the lens having the positive power, and d is the distance from the lens having the positive power to the focusing means.

7. An optical head apparatus, comprising:
a light source;
a collimating lens which converts a beam of light emitted from the light source into a substantially parallel beam of light;
a focusing means of focusing the light onto an information medium surface;
a beam splitting means of splitting the beam of light modulated by the information medium; and
a light receiving means of receiving the light modulated by the information medium,
wherein the collimating lens is moved along an optical axis to correct spherical aberration occurring on the information medium surface, and
wherein the apparatus satisfies the condition $$0.5fc < dc < fc$$

where fc is the focal length of the collimating lens, and dc is the distance from the collimating lens to the focusing means.

* * * * *

UNITED STATES PATENT AND TRADEMARK OFFICE
CERTIFICATE OF CORRECTION

PATENT NO. : 7,177,101 B2 Page 1 of 1
APPLICATION NO. : 10/486003
DATED : February 13, 2007
INVENTOR(S) : Yasuhiro Tanaka et al.

It is certified that error appears in the above-identified patent and that said Letters Patent is hereby corrected as shown below:

Column 20
Line 4 claim 3, change "occuring" to -- occurring --

Column 20
Line 25 claim 4, change "occuring" to -- occurring --

Signed and Sealed this

Twenty-seventh Day of November, 2007

JON W. DUDAS
*Director of the United States Patent and Trademark Office*